United States Patent
Nijhawan

(10) Patent No.: US 8,695,516 B2
(45) Date of Patent: Apr. 15, 2014

(54) POLLUTION ABATEMENT PROCESS FOR FOSSIL FUEL-FIRED BOILERS

(75) Inventor: Pramodh Nijhawan, Knoxville, TN (US)

(73) Assignee: Industrial Accessories Company, Mission, KS (US)

( * ) Notice: Subject to any disclaimer, the term of this patent is extended or adjusted under 35 U.S.C. 154(b) by 0 days.

(21) Appl. No.: 13/214,169

(22) Filed: Aug. 20, 2011

(65) Prior Publication Data

US 2011/0303133 A1 Dec. 15, 2011

Related U.S. Application Data

(63) Continuation-in-part of application No. 12/427,408, filed on Apr. 21, 2009, now abandoned.

(51) Int. Cl.
*F23J 15/02* (2006.01)

(52) U.S. Cl.
USPC .................. 110/345; 110/203; 110/216

(58) Field of Classification Search
CPC ......... F23J 15/00; F23J 15/003; F23J 15/006; F23J 15/02; F23J 15/022; F23J 15/025; F23J 15/027; F23J 2217/40; F23J 2219/60
USPC ........ 110/345; 137/896.1; 422/139, 169, 170, 422/171, 172, 173; 423/210, 215.5, 240 S, 423/244.07, 244.08, 242.1, 243.01, 239, 423/244

See application file for complete search history.

(56) References Cited

U.S. PATENT DOCUMENTS

| | | | | |
|---|---|---|---|---|
| 4,373,451 A | * | 2/1983 | Gardner et al. | 110/101 CC |
| 4,555,390 A | * | 11/1985 | Bhatia | 423/244.07 |
| 4,793,981 A | * | 12/1988 | Doyle et al. | 423/239.1 |
| 5,202,101 A | * | 4/1993 | Cohen et al. | 423/243.06 |
| 5,378,443 A | * | 1/1995 | Engstrom et al. | 423/239.1 |
| 5,500,195 A | * | 3/1996 | Garcia-Mallol | 423/240 R |
| 5,585,081 A | * | 12/1996 | Chu et al. | 423/239.1 |
| 6,143,263 A | * | 11/2000 | Johnson et al. | 423/242.1 |
| 6,685,902 B2 | * | 2/2004 | Morin et al. | 423/244.01 |
| 6,749,681 B1 | * | 6/2004 | Burdis et al. | 106/744 |

(Continued)

*Primary Examiner* — Kenneth Rinehart
*Assistant Examiner* — David J Laux
(74) *Attorney, Agent, or Firm* — Hovey Williams LLP

(57) ABSTRACT

The present invention provides improved boiler assemblies (10) with enhanced pollution abatement properties through injection and recycling of particulate sorbent materials including sodium bicarbonate, trona, and mixtures thereof. The assemblies (10) include a boiler (12), economizer (14), air heater (15), and recirculation reactor (16). Fresh sorbent material is introduced via assembly (60) into the boiler assembly (10) at one or more injection locations, and serves to sorb $NO_x$, $SO_x$, and other pollutants in the flue gas. The flue gas and entrained sorbent material then pass through reactor (16) for separation of sorbent, which is then recycled for injection back into the assembly (10) upstream of reactor (16). In another aspect, the invention provides pollution abatement apparatus (110) and methods employing an upstream recirculation reactor (114), a supply of fresh sorbent (118), and a downstream collector (116). In the reactor (114), fresh sorbent reacts with incoming hot flue gas (112) to generate a reduced pollutant flue gas (128) and a solids fraction including reacted sorbent and pollutants, and unreacted sorbent. Recirculation apparatus (120) provided between the reactor outlet (126) and reactor (114) serves to generate a substantially constant mass or volume flow rate of the reactor solids fraction, which minimizes the use of fresh sorbent and maximizes the pollution abatement efficiency of the apparatus (110).

15 Claims, 4 Drawing Sheets

(56) References Cited

U.S. PATENT DOCUMENTS

| | | | |
|---|---|---|---|
| 6,814,011 B2 * | 11/2004 | Saccani | 110/233 |
| 7,361,209 B1 * | 4/2008 | Durham et al. | 110/203 |
| 7,531,154 B2 * | 5/2009 | Maziuk, Jr. | 423/243.01 |
| 7,628,969 B2 * | 12/2009 | Holmes et al. | 423/242.1 |
| 8,196,532 B2 * | 6/2012 | Andrus et al. | 110/245 |
| 2008/0207443 A1 * | 8/2008 | Gadkaree et al. | 502/417 |

* cited by examiner

POLLUTION ABATEMENT PROCESS FOR FOSSIL FUEL-FIRED BOILERS

CROSS-REFERENCE TO RELATED APPLICATION

This is a continuation-in-part of application Ser. No. 12/427,408, filed Apr. 21, 2009, which is incorporated by reference herein in its entirety.

BACKGROUND OF THE INVENTION

1. Field of the Invention

The present invention is broadly concerned with boiler assemblies and methods of operation thereof giving enhanced pollution removal. More particularly, the invention is concerned with such assemblies and methods wherein fresh sorbent material is injected into the assembly and reacts with flue gas pollutants; the flue gas and entrained sorbent are then passed through a recirculation reactor where sorbent is recovered for reinjection into the system. In preferred forms, the assemblies include a flue gas recirculation reactor such as a multi-clone device and a downstream particulate separator/collector such as a bag house or electrostatic precipitator. A constant mass or volume flow recirculation reactor recycle rate is established at the reactor to maximize the efficiency of the system, and an optional, secondary, constant mass or volume flow recirculation rate apparatus may be employed between the collector and the reactor. The invention provides a high degree of pollution abatement with low cost operation.

2. Description of the Prior Art

In fuel-fired boiler assemblies, and particularly coal-fired power generating plants or other industrial processes, combustion products include many compounds having an adverse influence on boiler operation or are environmentally undesirable and subject to government regulation. Such compounds include sulfur oxides ($SO_x$), nitrogen oxides ($NO_x$), hydrochloric acid, and heavy metals such as Hg, As, Pb, Se, and Ca. Additionally, a significant number of nations, including the European Union and Japan, have taken steps to further limit the emissions of carbon dioxide.

In order to meet environmental limitations affecting the discharge into the atmosphere of the most prevalent of the widely regulated compounds, sulfur dioxide, combustion products from these plants and processes are commonly passed through flue gas desulfurization (FGD) systems. The treatment of flue gases to capture sulfur dioxide is often accomplished in lime or limestone-based wet, semi-dry and/or dry scrubbers where lime and limestone slurries and/or dry sorbents contact the flue gases before they are discharged to the atmosphere. The sulfur oxides are thereby chemically converted into insoluble compounds in the form of sulfites or sulfates. The sulfur oxides are thus converted into less environmentally harmful compounds which are either disposed of in landfills or treated and sold as marketable chemicals.

The $SO_3$ emission problem has been addressed chemically using a variety of alkaline chemicals (wet and dry) that are injected into the system at many different points in the flue gas flow path. Lime or limestone injected into the high temperature region of the boiler can also be effective in capturing the $SO_3$, but the commercial materials that are generally utilized tend to magnify boiler deposit problems and increase the quantity of particulates that can escape. Sodium compounds, such as the bisulfite, carbonate, bicarbonate and sodium sesquicarbonate (Trona) compounds have also been injected into the flue gas stream and are effective in $SO_2$ and $SO_3$ capture. Commercially available, but relatively expensive, oil-based magnesium additives can be effective in $SO_3$ capture. In that regard, one of the most effective chemical techniques for controlling both ash-related fouling in the boiler, and also the corrosion and emission problems associated with $SO_3$ generated in solid-fueled boilers, is the injection into the upper region of the boiler of oil slurries of MgO or $Mg(OH)_2$. That technology was originally developed for use with oil-fired boilers in which the magnesium-based oil suspension was usually metered into the fuel. It was later applied to coal-fired boilers. The most widely accepted mode of application of such additives today is by injection of slurries of MgO or $Mg(OH)_2$ into the boiler above the burners and just below the region at which a transition from radiant heat transfer to convective heat transfer occurs.

Another approach to $SO_3$ capture involves the use of so-called "overbased" organic-acid-neutralizing additives of the type that are included in motor oils and as fuel oil combustion additives. Those additives are actually colloidal dispersions of metallic carbonates, usually magnesium or calcium. When burned with the fuel, they are effective at near stoichiometric dosage in capturing $SO_3$ and in mitigating ash deposits caused by vanadium and/or sodium in the oil. The colloids are stabilized by carboxylic or sulphonate compounds and are known to provide mostly particles in the Angstrom range. Though very expensive, the "overbased" compounds are widely used at low dosages to capture vanadium in heavy-oil-fired combustion turbines.

In addition to oil-based slurries, $Mg(OH)_2$ powders and water-based slurries have also been utilized as fireside additives in boilers, but because of their generally coarser particle size they are less efficient in capturing the $SO_3$. Water slurries of MgO have also been injected through specially modified soot blowers installed on oil and Kraft-liquor-fired boilers, in which they moderated high temperature deposits but had only a nominal impact on $SO_3$-related problems because of an inability to apply the chemicals continuously.

In addition to limitations on $SO_x$ emissions, regulations aimed at controlling mercury emissions from coal-fired boilers have been promulgated by regulatory authorities, and regulations applicable to other toxic metals are anticipated eventually. A considerable amount of research aimed at finding practical techniques for capturing such toxic metals has shown that high-surface-area solids can capture a significant portion of mercury by adsorption, if the mercury is in an oxidized form rather than in an elemental form. Oxidants, either added to or naturally present in the fuel, such as chlorides, can facilitate the oxidation. Although high-surface-area lime can be effective in mercury capture, the usual commercial products can result in operational problems in the form of ash deposits and increased stack emissions. The most widely accepted way to achieve mercury capture has been the injection of expensive activated carbons in the cooler regions of the boiler gas path.

In addition, a variety of bromides and related compounds (e.g., iodates) have been used for control of mercury in boiler flue gasses, alone or in combination with activated carbon, clays, zeolites, and fly ash.

References describing the use of a plurality of inorganic carbonates, hydroxides and oxide compounds for boiler pollution abatement include: US Publications Nos. 2008/0286183; 2008/0233028; 2006/0005750; U.S. Pat. Nos. 6,528,030; 4,983,187; 4,824,441; 4,801,438; 4,783,197; 4,562,054; 4,522,626; 4,515,601; 4,226,601; 4,192,652; 4,148,613; 3,970,434; and German Patent No. DE 3,317,504.

Prior references which disclose the use of at least two carbonate, hydroxide or oxide compounds include: US Publications Nos. 2008/0060519; 2006/0034743; U.S. Pat. Nos.

7,276,217; 7,013,817; 5,505,746; 5,458,659; 5,350,431; 4,555,390; 4,280,817; 4,274,836; 4,092,125; and 4,055,400.

References teaching the use of single carbonates, hydroxides or oxides include: US Publications Nos. 2008/0279743; 2004/0202594; 2002/0050094; U.S. Pat. Nos. 7,374,590; 7,056,359; 5,368,617; 4,886,519; 4,574,045; 4,516,980; 4,423,702; 4,395,975; 4,305,728; and 4,302,207.

References describing the use of bromide compounds for removal of mercury with or without other inorganic components include: US Publications Nos. 2008/0182747; 2008/0134888; 2008/0121142; 2008/0115704; 2007/0180990; 2006/0205592; 2006/0204418; 2006/0185226; 2004/0086439; 2004/0003716; U.S. Pat. No. 6,878,358; PCT Publication No. WO 2006/101499; US Publications Nos. 2008/0207443; 2008/0127631; 2006/0210463; 2003/0161771; U.S. Pat. Nos. 4,859,438; 4,663,136; 4,233,175; and 4,115,518.

The longstanding pollution abatement technologies employed with fossil fuel-fired boiler assemblies, while useful to a certain degree, do not achieve the highest degree of pollution control. Moreover, the prospect of increasingly stringent government pollution regulations makes it imperative that improved technologies be provided. It is the aim of the present invention to remedy this problem.

SUMMARY OF THE INVENTION

The present invention overcomes the problems outlined above and provides improved boiler assemblies and methods characterized by a high degree of pollution abatement and low-cost operation. The boiler assemblies generally include a fossil fuel inlet, a boiler chamber coupled with the fuel inlet to receive fossil fuel for burning thereof, an economizer assembly comprising an inlet coupled with the boiler, an economizer chamber, and an economizer outlet, an air heater coupled with the economizer outlet, and a recirculation reactor coupled with the air heater.

In operation, a pollution sorbent material including a member selected from the group consisting of sodium bicarbonate, trona and mixtures thereof is provided at a normalized stoichiometric ratio of from about 0.2-3 based upon the level of sulfur in the fossil fuel. Fresh sorbent material is introduced into the boiler assembly at least one injection point during the burning of the fossil fuel in the boiler, thereby causing the material to sorb at least some of the sulfur pollutants created during the burning of the fossil fuel, and creating a stream of hot flue gas and entrained sorbent material which passes through the assembly and ultimately into the recirculation reactor. In the recirculation reactor, at least some of the entrained sorbent material is recovered and is injected back into the boiler assembly at a recovered sorbent injection point upstream of the recirculation reactor. The boiler assembly is operated so as to maintain the temperature of the hot flue gas passing from the recirculation reactor at a temperature of at least about 25° F. above the adiabatic saturation temperature of the flue gas, and such that the retention time of the hot flue gas passing through the recirculation reactor is from about 1-4 seconds.

The fresh and recovered sorbent material injection points may be the same (e.g., into the boiler of the assembly) or may be different. Preferably, both the fresh and recovered sorbent are injected through the use of plural high pressure injection lances extending into the assembly.

The sorbent material for use in a given boiler assembly is custom-designed depending upon the characteristics of the fossil fuel and operating conditions. For example, if Hg is present in the fuel, bromide compounds may be used. The sorbent material is advantageously in fine particulate form, and typically has an average particle diameter in the range of 20 to 50μ.

In other preferred embodiments, efficient pollution abatement is achieved through use of a recirculation reactor (e.g., a cyclone or multi-clone assembly) which receives hot flue gas containing entrained pollutants together with injected fresh sorbent, and a downstream particulate separator/collector such as a bag house of electrostatic precipitator (ESP). A primary, constant mass or volume flow rate recycle is established at the recirculation reactor which minimizes use of fresh sorbent. A secondary, constant mass or volume flow rate recycle may also be established between the downstream collector and the upstream recirculation reactor. Preferably, constant mass flow recycle rates are obtained through use of weighing devices at the underflow solids outlets of the recirculation reactor and separator, respectively.

For multi-pollutant emission control, a mixture of sorbents can be created to provide control of $SO_3$; $SO_2$; Hg; As and/or other toxic emissions. The mixture of calcium bromide and magnesium or sodium-based compounds is often preferred, especially a mixture including a pollution sorbent material for injection into a fuel-fired boiler assembly to remove Hg emissions from the boiler assembly, said material including therein calcium bromide, sodium carbonate, and a member selected from the group of trona, magnesium oxide, and mixtures thereof. Calcium bromide will remove the Hg emissions when $SO_3$ is not in the flue gas. The quantities of use will be determined by the degree of control required. This design can also be incorporated into various industrial applications, such as cement and lime kilns. When use is made of such sorbent material, it can be introduced into a boiler assembly with the use of a recirculation reactor or without any such recovery and recirculation.

In other embodiments, the sorbent materials of the invention may be introduced or injected with appropriate quantities of powdered activated carbon (PAC). In this way, the requisite amounts of PAC can be minimized.

DETAILED DESCRIPTION OF THE PREFERRED EMBODIMENTS

Figure 1:
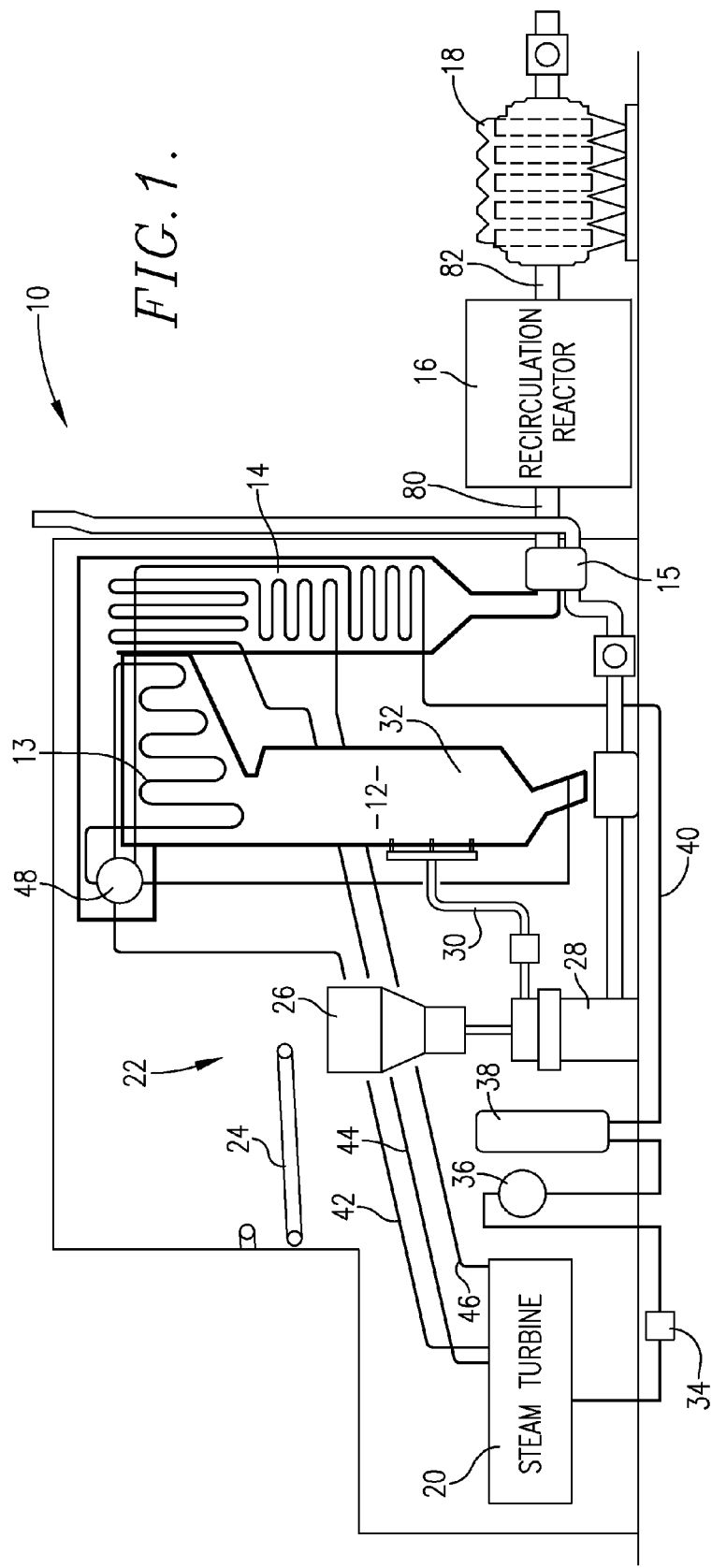
FIG. 1 is a schematic representation of an exemplary coal-fired boiler assembly employing the invention.
Figure 2:
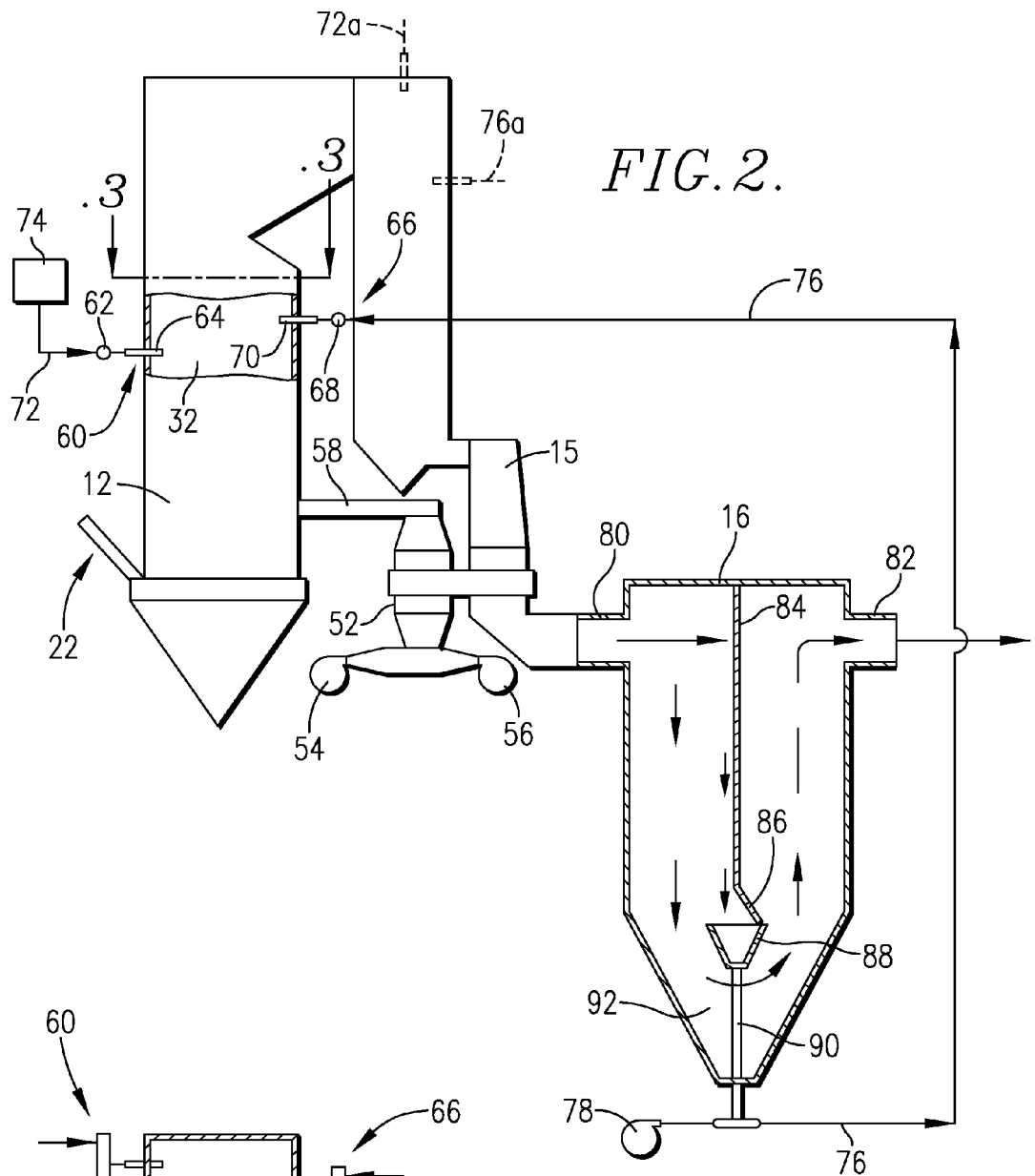
FIG. 2 is a schematic view partially in section illustrating the design and hook-up of the preferred recirculation reactor of the invention
Figure 3:
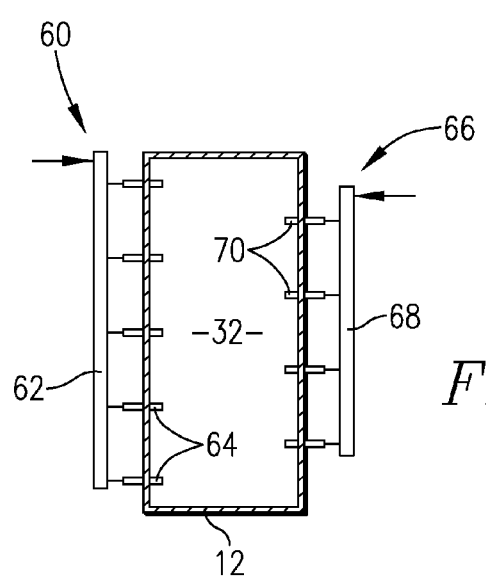
FIG. 3 is a sectional view taken along line 3-3 of FIG. 2 and depicting the orientation of the preferred injection lances for injection of fresh sorbent, and for injection of recovered sorbent material from the recirculation reactor back into the boiler assembly.

The Embodiment of FIGS. 1-3

Turning now to the drawings, and particularly FIG. 1, an exemplary fossil fuel-fired boiler assembly 10 is schematically depicted in FIG. 1. Broadly speaking, the assembly 10 includes a boiler 12 including a superheater 13, economizer 14, air preheater 15, recirculation reactor 16, and a precipitator 18 (which can also be baghouse or other particulate collector) leading to a flue gas stack (not shown). The assembly 10 further has a steam turbine 20 (typically comprising interconnected low, intermediate and high pressure turbines), and a coal delivery assembly 22. The latter has a coal conveyor 24, coal hopper 26, coal pulverizer 28, and coal injector 30 operable to inject pulverized coal into the chamber 32 of boiler 12. A feedwater pump 34, the aerator 36 and heater 38 are located within feedwater line 40 leading to the economizer 14. Separate steam lines 42, 44, and 46 respectively extend between steam turbine 20 and boiler steam drum 48, and between the turbine 20 and economizer 14 as shown. An electrical generator and transformer is also operably coupled with turbine for power generation.

In broad outline, pulverized coal (and/or other solid and/or biomass fuel) is fed into chamber 32 where combustion occurs, creating hot flue gas. This gas passes in serial order through superheater 13, economizer 14, air preheater 15, recirculation reactor 16, and precipitator 18. The thermal energy created by this combustion drives steam turbine 20 to thus generate electricity.

As noted above, pollution abatement in assembly 10 is a critical feature, especially in the context of removing $SO_x$ gases and any heavy metals such as Hg and As. To this end, the present invention contemplates an improved injection/recirculation assembly 50 illustrated in FIGS. 2-3. As illustrated, the air preheater 15 in this design has a secondary air assembly 52 equipped with forced draft fans 54 and 56, with the assembly 52 also supplying positive pressure air to the windbox of boiler 12 via conduit 58. Also, the assembly 50 provides a fresh sorbent material injection assembly 60 in the form of a manifold 62 and a plurality of individual, spaced apart injection lances 64 extending into chamber 32 (FIG. 3). A recovered sorbent material injection assembly 66 is also provided which is likewise in the form of a manifold 68 and a plurality of individual, spaced apart injection lances 70. A fresh sorbent material conveying line 72 extends from a source of fresh sorbent 74 to the manifold 62. A recovered sorbent material recirculation line 76 extends from the bottom of reactor 16 to manifold 68. An eductor 78 serves to generate an airstream for conveying of recovered sorbent material through line 76.

The reactor 16 includes and inlet 80 coupled with air heater 15 as well as an outlet 82 leading to precipitator 18. Internally, the reactor 16 has an upright baffle wall 84 having a lowermost oblique section 86 leading to an open-top collector 88. The collector 88 has a vertically extending outlet tube 90 passing through the bottom of reactor 16 and in communication with eductor 78 and line 76. The region 92 below collector 88 is open so as to permit flow of gas from inlet 80 downwardly through the reactor 16 and upwardly for passage through outlet 82.

In practice, fresh sorbent from source 74 is fed at a controlled rate through line 72, manifold 62 and lances 64 for injection into chamber 32. The injected fresh sorbent is designed to sorb objectionable pollutants created during the combustion process, and especially $SO_x$ gases and heavy metals. Owing to the need to remove the maximum extent of such pollutants, the fresh sorbent is normally injected in a normalized stoichiometric ratio (NSR) of from about 0.2-3, more preferably from about 1-2.5, based upon the level of sulfur and/or mercury in the coal or other fossil fuel. Consequently, some of the sorbent is entrained within the hot flue gases created within chamber 32 and passes with these gases through the system to recirculation reactor 16. In the reactor 16, the stream of hot flue gas and entrained sorbent material encounters baffle wall 84, thereby diverting the gas downwardly and facilitating gravitational separation of the entrained sorbent material from the gas. Such separated material is collected in collector 88 and passes downwardly through pipe 90. Thereupon, the recovered sorbent material is conveyed by positive pressure through line 76 to manifold 68 and lances 70 for injection back into chamber 32. In this fashion, much greater pollution abatement efficiencies are obtained, as compared with simple injection of fresh sorbent material.

Although the assembly 50 has been illustrated in FIGS. 2-3 with injection of both fresh and recovered sorbent material into the chamber 32, the invention is not so limited. Thus, the injection of fresh sorbent can occur at one or more material injection points throughout the assembly 10, e.g., points selected from the group consisting of the fossil fuel injector 30 (which includes any point in the coal delivery assembly 22), the boiler chamber 32, the economizer assembly 14, the recirculation reactor 16, and conduit structure between any of these components. In like manner, the injection of recovered sorbent material can be carried out at one or more recovered sorbent injection points anywhere upstream of reactor 16, such as those selected from the group consisting of the fossil fuel injector 30 as defined above, the boiler chamber 32, the economizer assembly 14, and conduit structure there between. While the fresh and recovered sorbent material can be injected at the same points, often they will be injected at different points within the boiler assembly 10. Exemplary alternate injection points for the fresh and recovered sorbent materials are illustrated in FIG. 2 at 72a and 76a.

In particularly preferred embodiments, the injection lances 64 and 70 are spaced apart and often are oriented in multiple, vertically spaced apart rows. Additionally, the respective lances may be inserted into the assembly 10 at varying depths depending upon the operational characteristics of the assembly. Although it would be possible to mix the fresh and recovered sorbent materials, in preferred practice these are separately injected. The lance injections are advantageously carried out at stream velocities of at least about 3,000 ft./min., and more preferably at least about 4,500 ft./min., with lance exit pressures greater than 1 psi at the bases of the lances.

The operation of the recirculation reactor 16 is preferably carried out under boiler assembly operating conditions assuring that the temperature of the hot flue gas passing from the recirculation reactor through outlet 82 is at a temperature of at least about 25° F. (more preferably at least about 50° F.) above the adiabatic saturation temperature of the flue gas. Further, the retention time of the hot flue gas passing through the recirculation reactor is from about 1-4 seconds, preferably from about 1-3 seconds.

The sorbent materials useful in the invention include a member selected from the group consisting of sodium bicarbonate, trona, and mixtures thereof at a NSR of 0.2-3, based upon the level of sulfur in the starting fossil fuel. For mercury control, the sorbent is mixed with calcium bromide in an engineered proportion. In addition however, a given sorbent material will typically be custom-designed for the particular types of pollutants present in the fuel and/or generated during combustion. Other common ingredients in such sorbent materials would be calcium oxide, calcium hydroxide, and calcium carbonate; magnesium oxide and magnesium hydroxide; calcium bromide, magnesium bromide, and sodium bromide. Where calcium and magnesium compounds are employed, they are each commonly used at a NSR of from about 0.2-2 (more preferably from about 0.5-1) based upon fuel sulfur content. Where mercury removal is an issue, bromides are normally used at a level of from about 2-15 lbs. (more preferably from about 5-10 lbs.) per ton of incoming fuel feed.

The sorbent materials useful in the invention are preferably provided as heterogeneous fine powders to facilitate dispersion thereof and ultimate sorbing and/or reaction of pollutants. Generally, the individual ingredients making up the sorbent materials should have an average particle size of up to about 200µ, more preferably up to about 50µ. It is also preferred to have varying average particle sizes depending upon the injection site for the fresh sorbent material. Hence, the fresh sorbent material should have an average particle size of up to about 100µ when introduced at the fuel inlet, an average particle size of up to about 50µ when introduced into the boiler chamber, an average particle size of up to about 50µ when introduced into the economizer assembly, and an average particle size of up to about 50µ when introduced into the recirculation reactor.

The invention is applicable to virtually all types of fossil fuel-fired boiler and like assemblies including lime and cement kiln and incinerators. Representative examples include stoker furnaces, cyclone furnaces, pulverized coal furnaces, and fluidized-bed furnaces, which may utilize a variety of boiler systems including fire tube, water tube, water-cooled integral furnace, and once-through boilers.

Numerous advantages are realized through use of the present invention. First and foremost is the advantage of enhanced pollution abatement, stemming from reduction of $NO_x$, and $SO_x$ emissions, as well as Mercury and heavy metal emissions. The use of a recirculation reactor in accordance with the invention maintains essentially a fixed amount of sorbent material in continuous circulation, which helps control emissions and also minimizes sorbent costs. When the circulating sorbent reacts with $SO_x$ gases, sulfates form on the outer layers of the sorbent particles. The inner core of the particles remains unreacted, and will thereafter fracture, exposing further fresh sorbent for additional reaction.

Figure 4:
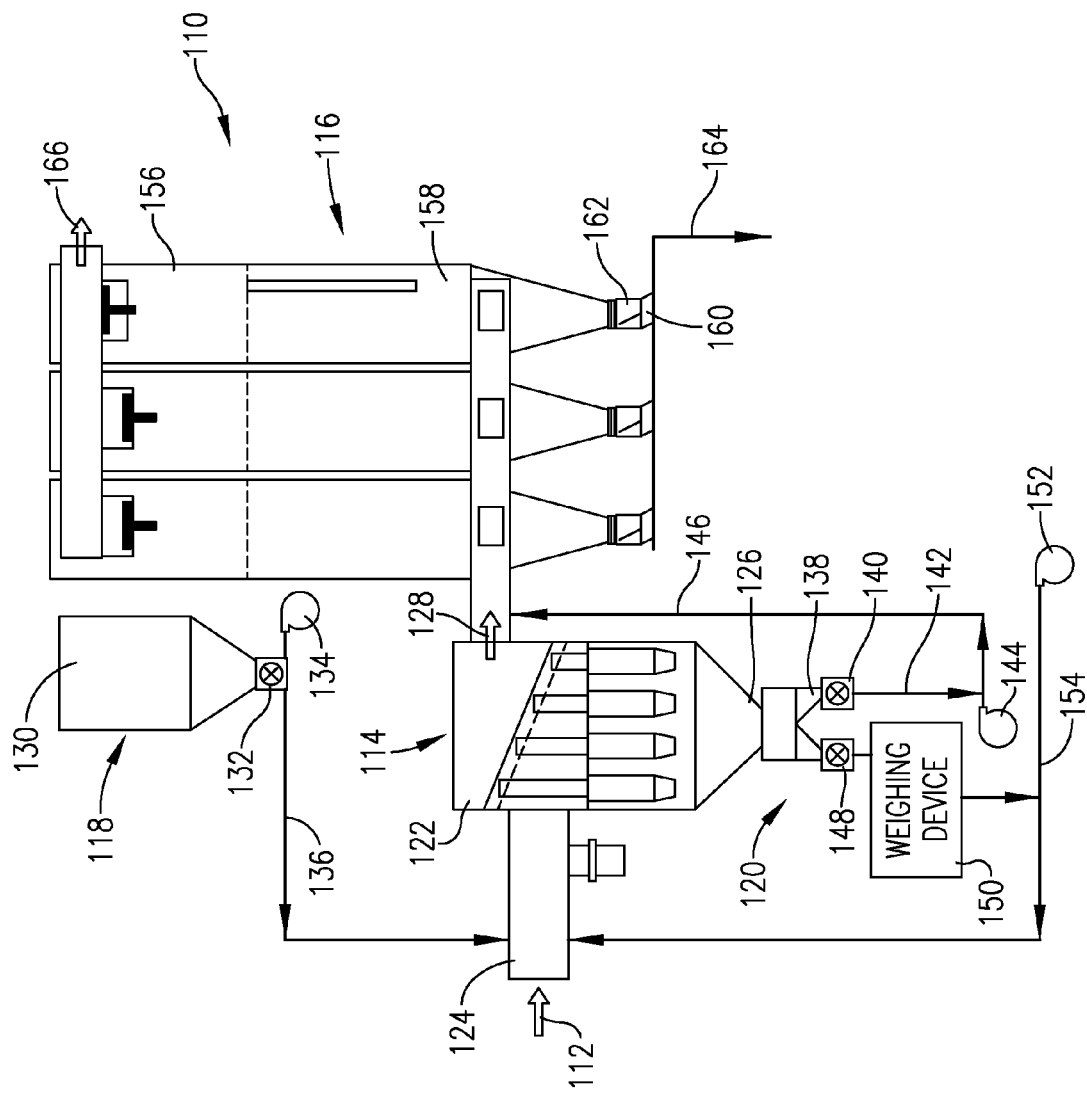
FIG. 4 is a schematic view of a pollution abatement system downstream of a boiler or the like, and including a source of fresh sorbent, an upstream recirculation reactor, a downstream particulate collector, and apparatus to create a constant mass flow rate recirculation stream for the recirculation reactor.
Figure 5:
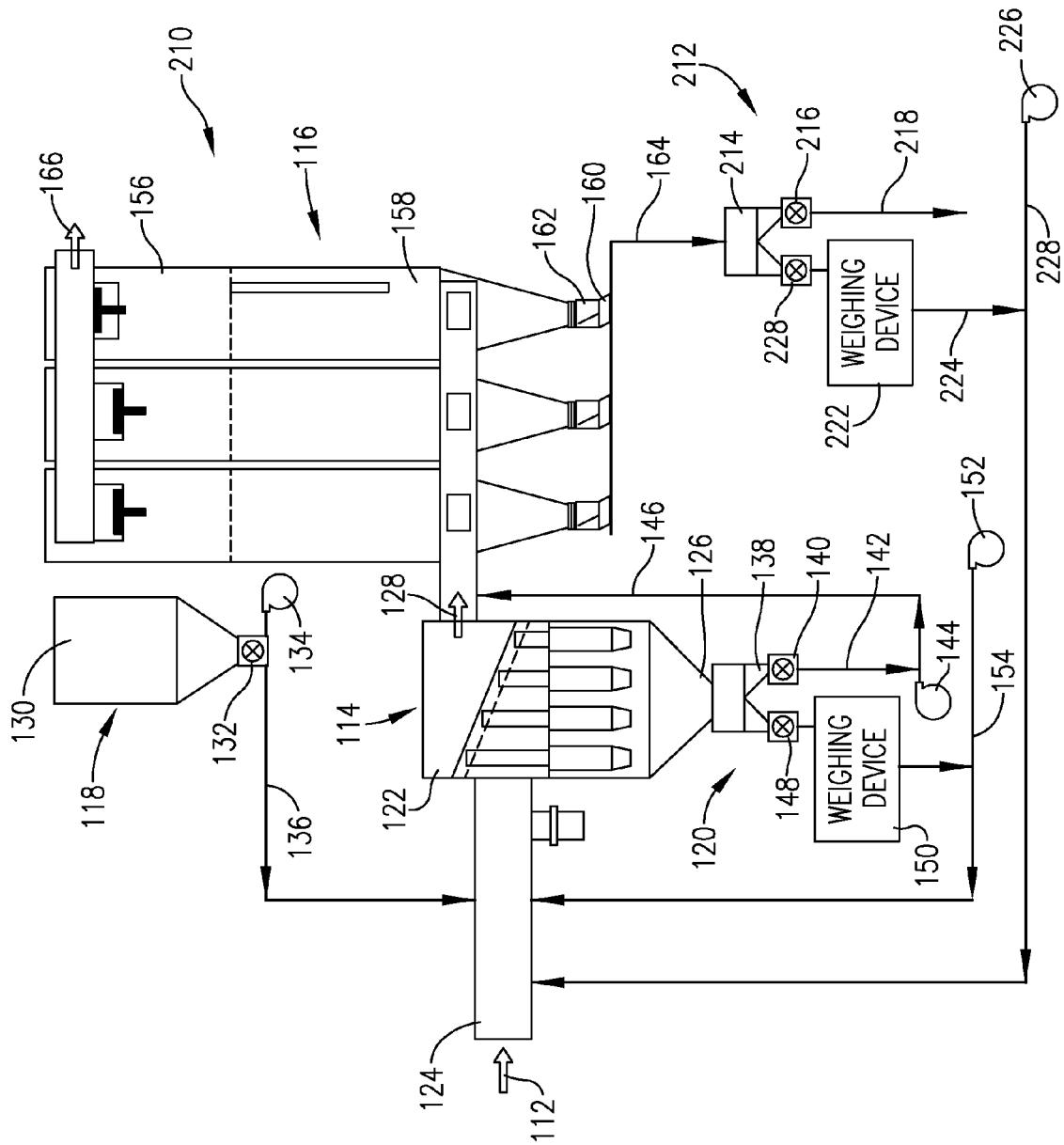
FIG. 5 is a schematic view similar to that of FIG. 4, but including apparatus to create a constant mass flow rate recirculation stream from the downstream particulate collector to the upstream recirculation reactor.

The Embodiments of FIGS. 4-5

Referring first to FIG. 4, a pollution abatement assembly 110 is provided, which is designed to receive flue gas 112 containing entrained pollutants from a conventional boiler assembly or the like (not shown), which may be any of the types described in connection with FIGS. 1-3. The abatement assembly 110 broadly includes an upstream recirculation reactor 114 and a downstream particulate separator/collector 116, a supply 118 of fresh sorbent, and apparatus 120 associated with the recirculation reactor 114 to generate a recycle from the output of separator 114 to the input thereof, which is characterized by a substantially constant mass or volume flow rate (i.e., there is a substantially constant recirculation amount, measured as mass or volume, of material per unit time). The assembly 110 provides a way to maximize the efficiency of the recirculation reactor 114 and to minimize the amount of fresh sorbent required during operation.

In more detail, the recirculation reactor 114 is advantageously in the form of a cyclone or multi-clone 122 having an inlet 124 for flue gas 112, and an underflow solids outlet 126. Those skilled in the art will appreciate that however selected, a cyclonic separator of these types serve to gravitationally separate solids from the incoming flue gas 112, creating a particulate solids output at outlet 126 and a separated flue gas overhead 128 which passes to the downstream collector 116.

Fresh sorbent is maintained within a bin or hopper 130 having an outlet valve 132. A positive displacement blower 134 serves to convey fresh sorbent via line 136 to the inlet 124 of multi-clone 122. Contact between the flue gas, laden with polluting solids such as sulfur oxides, nitrogen oxides, hydrochloric acid, and heavy metals (e.g., Hg, As, Pb, Se, and Ca) and the sorbent within inlet 124 and multi-clone 122, serves to sorb a high proportion of the pollutants such that the particulates from outlet 126 comprises spent sorbent reacted with pollutants, and unreacted sorbent. The flue gas overhead 128 contains a significantly reduced quantity of pollutant solids, which is then largely removed in the separator 116.

The apparatus 120 of this embodiment includes a dual valve outlet assembly 138 having a first valve 140 coupled with an outlet line 142. A positive displacement blower 144 conveys the particulates from valve 140 via line 146 to the inlet of collector 116, along with treated flue gas 128. The assembly 138 includes a second valve 148 and a weighing device 150 for continuously monitoring the weight of solids passing through valve 148. A positive displacement blower 152 operates to convey material from weighing device 150 along line 154 for recirculation back to the inlet 124 of reactor 122.

The downstream collector 116 is advantageously in the form of a bag house 156 of conventional design and presenting a plurality of collector bags 158 each having an outlet 160. Knife gate valves 162 is provided at the outlets 160 for producing a solid waste stream 164. The overhead 166 from the bag house 156, having a substantially reduced pollutant content, passes to the atmosphere.

An important feature of the invention is the provision of apparatus 120 serving to generate a recirculation flow rate which is substantially constant (preferably within plus or minus 10% of absolute constant) during stable running of assembly 110, i.e., after sufficient time has elapsed (usually several hours) to equilibrate the system. Using this technique, a substantially constant amount (measured as mass or volume) of solids comprising unreacted sorbent, spent sorbent and sorbed pollutants, is delivered via recirculation line 154 to inlet 124 per unit time. Inasmuch as a constant amount per unit time of unreacted sorbent is delivered via line 154, it is then possible to inject only the minimum amount of fresh sorbent via line 136 to the inlet 124, to meet the pollution abatement standard for the overall system. Moreover, if additional abatement is desired, the amount of fresh sorbent can be increased. Stated otherwise, the present invention provides a way of controlling both the input of fresh sorbent from supply 118 and the input of unreacted sorbent from valve 148 to achieve the most efficient and lowest cost pollution abatement.

FIG. 5 depicts an embodiment comprising a pollution abatement assembly 210, which is identical in most respects with the assembly 110; accordingly, identical components are identically number in both of these embodiments. However, the embodiment 210 provides a secondary recycle apparatus 212 which operatively couples the waste stream line 164 and the inlet 124 of multi-clone 122. The apparatus 212 provides a dual valve outlet assembly 214 having a first rotatable valve 216 leading to a waste line 218. A second leg of the assembly 214 includes a rotary valve 220 leading to a weighing device 222 for continuously monitoring the weight of material in output line 224. A positive displacement blower 226 coupled to recycle line 228 and serves to direct recycle material to inlet 124 as shown. The operation of secondary recycle apparatus 212 is identical with that of the apparatus 120, and specifically it establishes a substantially constant mass or volume flow rate of material, including unreacted sorbent, which is directed to the multi-clone recirculation reactor 122. The use of apparatus 212, in conjunction with apparatus 120, provides a further degree of operation efficiency, and is therefore preferred.

It will be appreciated that the various types of sorbents, operating conditions, and applicable systems describe in connection with the FIGS. 1-3 embodiment are equally applicable to the embodiments of FIGS. 4-5, except as indicated below. It is preferred that the FIGS. 4-5 embodiments make use of a recirculation reactor having a removal efficiency in the range of 80-90%, i.e., the reactor will remove this quantity of the entrained particulates within the flue gas. Furthermore, the recirculation from the recirculation reactor should be maintained at a constant mass or volume flow rate, which is typically greater than three times the corresponding flow rate of fresh sorbent, and the flow rate of the fresh sorbent should be at a minimum flow rate required to achieve the design pollution abatement, which is typically a NSR of less than about 2, and more preferably about 1.2. In this fashion, the efficiencies of the pollution abatement systems of the invention are maximized.

I claim:

1. Pollution abatement apparatus for removing pollutants from hot flue gas, comprising:
    a recirculation reactor including inlet structure operable to receive said flue gas, a flue gas outlet, and a solids outlet;
    a bin operable to hold a sorbent for said pollutants;
    a sorbent delivery device for transferring sorbent from said bin to said reactor,
    said reactor operable to react said sorbent and said pollutants, and to generate at said flue gas outlet a flue gas stream having a reduced pollutant content, and at said solids outlet solids including reacted sorbent and pollutants, and unreacted sorbent;
    a particulate collector including a flue gas inlet operable to receive said flue gas stream from said reactor, and a collected solids outlet; and
    recirculation apparatus operably coupled between said reactor solids outlet, said particulate collector, and said reactor, said recirculation apparatus including structure comprising valve assembly presenting a pair of outlets operable to divide the solids from said reactor solids outlet into first and second streams, to direct one of said first and second streams to said reactor, and to direct the other of said first and second streams to said particulate collector, said one stream directed to said reactor including said reacted sorbent, pollutants, and unreacted sorbent,
    said recirculation apparatus further including structure comprising a weighing device operable to continuously monitor the weight per unit time of one of said streams.

2. The apparatus of claim 1, said valve assembly including a pair of valves each comprising a rotary valve.

3. The apparatus of claim 1, said recirculation apparatus comprising a blower assembly operable to convey first and second streams of solids to said reactor and said particulate collector, respectively.

4. The apparatus of claim 1, said reactor selected from the group consisting of a cyclone and a multi-clone.

5. The apparatus of claim 1, said particulate collector comprising a bag house.

6. The apparatus of claim 1, including a secondary recirculation apparatus operably coupled between said collected solids outlet and said recirculation reactor.

7. A method of reducing pollution in an incoming flue gas containing entrained pollutants, said flue gas derived from combustion of fuel, said method comprising the steps of:
    directing said flue gas and fresh sorbent for said pollutants to a reactor, said directing step comprising the steps of delivering said sorbent from a sorbent bin using a sorbent delivery device, said reactor having inlet structure operable to receive said flue gas and fresh sorbent, a flue gas outlet, and a solids outlet, said reactor generating a flue gas output stream from said flue gas outlet having a reduced pollutant content, and a solids output from said solids outlet, said solids output including reacted sorbent and pollutants, and unreacted sorbent;
    dividing said solids output from said reactor solids outlet using recirculation apparatus operably coupled between said reactor solids outlet, said reactor, and a particulate collector, into first and second streams, said recirculation apparatus comprising a valve assembly presenting a pair of outlets directing one of said first and second streams to said reactor, and directing the other of said first and second streams to said particulate collector, said particulate collector including a flue gas inlet operable to receive said flue gas stream from said reactor, and a collected solids outlet, and continuously monitoring the weight per unit time of one of said streams using a weighing device, said one stream directed to said reactor including reacted sorbent, pollutants, and unreacted sorbent; and
    collecting solids using said particulate collector.

8. The method of claim 7, said reactor selected from the group consisting of a cyclone and a multi-clone.

9. The method of claim 7, including the step of collecting said solids using a baghouse.

10. The method of claim 7, including the step of introducing said fresh sorbent to said reactor at a normalized stoichiometric ratio of from about 0.5-4, based upon the level of pollutants in said fuel.

11. The method of claim 10, said ratio being from about 0.8-1.8.

12. The method of claim 7, said fuel selected from the group consisting of coal, other fossil fuel, and mixtures thereof.

13. The method of claim 7, said sorbent selected from the group consisting of compounds of Br, Mg, Ca, and mixtures thereof.

14. The method of claim 7, said incoming flue gas having a temperature of from about 600-1500° F.

15. The method of claim 7, said fresh sorbent material having an average particle size of up to about 200μ.

* * * * *